United States Patent [19]
Nuijens et al.

[11] 3,923,547
[45] Dec. 2, 1975

[54] BATTERY OF PRIMARY CELLS

[75] Inventors: Hubertus Ludovicus Cornelius Nuijens, Tessenderlo, Belgium; Robert Theodorus Maria Doedee; Adrianus Cornelis Josephus Maria Snethorst, both of Eindhoven, Netherlands

[73] Assignee: U.S. Philips Corporation, New York, N.Y.

[22] Filed: May 15, 1974

[21] Appl. No.: 470,275

[30] Foreign Application Priority Data
May 15, 1973 Netherlands .......................... 736715

[52] U.S. Cl. ................. 136/107; 136/131; 136/163
[51] Int. Cl.² .......................................... H01M 1/02
[58] Field of Search ................... 136/163, 131–133, 136/107, 166–167, 147

[56] References Cited
UNITED STATES PATENTS

| | | | |
|---|---|---|---|
| 1,925,374 | 9/1933 | Deibel | 136/133 |
| 2,981,782 | 4/1961 | Warren et al. | 136/131 X |
| 3,278,339 | 10/1966 | Reilly et al. | 136/107 |
| 3,437,530 | 4/1969 | Anderson | 136/132 |
| 3,513,033 | 5/1970 | Watanabe et al. | 136/107 |
| 3,573,106 | 3/1971 | Johnson et al. | 136/131 |

*Primary Examiner*—Anthony Skapars
*Attorney, Agent, or Firm*—Frank R. Trifari; Norman N. Spain

[57] ABSTRACT

A battery consisting of a single primary cell or a plurality of series or parallel-arranged cells whose metal electrode is also the cell wall in an envelope in which the space between the cell wall and the envelope comprises one or more materials which are capable of binding possibly released electrolyte by increasing the viscosity of the electrolyte.

3 Claims, No Drawings

BATTERY OF PRIMARY CELLS

The invention relates to a battery comprising at least one primary cell in which the metal electrode is simultaneously serving as a cell wall.

The most widely used form of the relevant primary cell is that according to Leclanche in which a depolorizing mass consisting of $MnO_2$ and carbon powder is pressed about a carbon rod, which assembly forms one electrode and is filled with an electrolyte consisting of a solution of zinc chloride together with ammonium chloride which in turn is placed in a beaker consisting of zinc metal constituting the other electrode and at the same time the cell wall and being separated therefrom by means of a separator. This form provides a voltage of approximately 1.5 Volt.

There are different embodiments according to which a single cell as such is used or more of such primary cells are combined to a battery. Three of such cylindrical cells may be stacked on each other and may be electrically arranged in series by constant of the central electrode of one with the cell bottom of the next.

Another embodiment comprises three cylindrical cells which are juxtaposed in an insulting envelope.

The embodiments described hereinbefore are considered to be well-known.

A problem which is still not solved in a satisfactory manner in batteries of this type of cells is leakage during discharge. During discharge of the cell the metal electrode is used up and after discharge of the cell holes are produced in the wall so that the electrolyte can emerge. Since many batteries are built in apparatus this is inadmissible due to possible damage to the apparatus by the corrosive electrolyte.

In the single cell battery an envelope has been provided around the zinc beaker which envelope consists of for example polyvinyl chloride. This is a solution which is very satisfactory in practive, but which is more difficult and less effective for multiple cells. For the most commonly used 4.5 volt embodiment the synthetic resin envelope divided in compartments has been provided with tar. However, this too is an operation which is difficult to control in practice and does not provide an adequate solution.

The invention provides an embodiment which prevents the leakage of liquid in a very satisfactory manner and yet allows gas to pass reasonably.

To assess the density of the liquid of the battery, this battery is discharged in this case across a resistor of 15 ohms during 6 weeks.

The battery of at least one primary cell consisting of a single cell or series or parallel-arranged cells whose metal electrode is also the cell wall in an envelope is characterized according to the invention in that the space between the cell wall and the envelope comprises one or more materials which are capable of binding possibly released electrolyte by increasing the viscosity of the electrolyte.

Materials which are suitable for this purpose are starch or cellulose types soluble in cold water or polymers such as carboxymethyl cellulose, thermally decomposed maise starch and polyvinyl alcohyl.

These materials may be mixed with absorbing materials such as sand.

It is recommended to pour for example wax or tar on the upper side of the battery in order to retain the said materials mechanically.

A three-cell Leclanche battery of the system $C/MnO_2/ZnCl_2-NH_4Cl/Zn$ is mentioned as an example in which the zinc electrode constitutes the wall of each cell. Three of these cells are juxtaposed and combined in a polystyrene housing with partitions of the same material. The space between the cells and the envelope is filled with granular carboxymethyl cellulose whereafter tar is poured on the assembly. These batteries are compared with the same embodiment, however, without carboxymethyl cellulose by connecting a 15 Ohm resistor between the terminals and by putting the batteries upside down at ambient temperature during 6 weeks.

After 6 weeks less than 5% of the embodiment according to the invention showed a leak. Of the batteries which were only provided with tar more than 50 % showed a leak after 6 weeks.

What is claimed is:

1. A battery comprising at least one primary cell consisting of a single cell or series of parallel-arranged cells whose metal electrode is also the cell wall in an envelope, characterized in that the space between the cell wall and the envelope comprises at least one material capable of binding possible released electrolyte by increasing the viscosity of the electrolyte.

2. A battery as claimed in claim 1, characterized in that the space is filled with at least one binding agent selected from the group consisting of cold water soluble cellulose, starch and polymer.

3. A battery as claimed in claim 1, characterized in that a conventional sealing agent which is solid at room temperature is poured on the open side of the battery.

* * * * *

UNITED STATES PATENT AND TRADEMARK OFFICE
CERTIFICATE OF CORRECTION

PATENT NO. : 3,923,547
DATED : December 2, 1975
INVENTOR(S) : HUBERTUS LUDOVICUS CORNELIUS NUIJENS ET AL It is certified that error appears in the above-identified patent and that said Letters Patent are hereby corrected as shown below:

In the Title Page, Item [30], "736715" should be -- 7306715 --.

Col. 1, line 31, "in" should be -- into --.

line 49, "during" should be -- for --.

Col. 2, line 10, after "cellulose" insert -- of the --.

line 12, "maise" should be -- corn --.

line 19, cancel "mentioned as";

after "example" insert -- of the invention -- line 24, change "whereafter" to -- after which --.

Signed and Sealed this

Fourteenth Day of September 1976

[SEAL]

Attest:

RUTH C. MASON
*Attesting Officer*

C. MARSHALL DANN
*Commissioner of Patents and Trademarks*